US011276137B1

(12) United States Patent
Sideris et al.

(10) Patent No.: US 11,276,137 B1
(45) Date of Patent: Mar. 15, 2022

(54) GRAPHICS PROCESSING SYSTEMS WITH CONDITIONAL EVICTIONS

(71) Applicant: Arm Limited, Cambridge (GB)

(72) Inventors: Isidoros Sideris, Cambridge (GB); Stephane Forey, Cambridge (GB); William Robert Stoye, Cambridge (GB); John David Robson, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/201,229

(22) Filed: Mar. 15, 2021

(30) Foreign Application Priority Data

Jan. 29, 2021 (EP) .................................. 21386007

(51) Int. Cl.
*G06T 1/20* (2006.01)
*G06T 1/60* (2006.01)
(52) U.S. Cl.
CPC ................. *G06T 1/20* (2013.01); *G06T 1/60* (2013.01)
(58) Field of Classification Search
CPC ..................................... G06T 1/20; G06T 1/60

USPC ........................................................ 345/501
See application file for complete search history.

(56) References Cited

U.S. PATENT DOCUMENTS

| 2008/0074433 | A1* | 3/2008 | Jiao ...................... G06T 15/005 345/522 |
| 2019/0087928 | A1* | 3/2019 | Forey .................... G06F 9/3851 |

* cited by examiner

*Primary Examiner* — Jacinta M Crawford
(74) *Attorney, Agent, or Firm* — Vierra Magen Marcus LLP (57) ABSTRACT

There is provided a graphics processor comprising a programmable execution unit operable to execute programs for respective execution thread groups. An eviction checking circuit is provided that is configured to check instructions as they are being fetched for execution from an instruction cache to determine whether the instruction includes any conditional eviction conditions that if not met indicate that the program to which the instruction relates should not continue to be executed for the group of execution threads. The eviction checking circuit is then configured to check whether any conditional eviction conditions are satisfied at this point and either allow the execution unit to continue program execution or cause the thread group to be evicted.

20 Claims, 4 Drawing Sheets

GRAPHICS PROCESSING SYSTEMS WITH CONDITIONAL EVICTIONS

BACKGROUND

The technology described herein relates generally to the operation of graphics processors (graphics processing units, GPUs), and in particular to the operation of graphics processors that include a programmable execution unit (e.g. shader) operable to execute a set of instructions in a program to perform data processing operations.

Many graphics processors now include one or more processing (shader) cores, that execute, e.g., programmable processing stages, commonly referred to as "shaders", of a graphics processing pipeline that the graphics processor implements. For example, a graphics processing pipeline may include one or more of, and typically all of: a geometry shader, a vertex shader and a fragment (pixel) shader. These shaders are programmable processing stages that execute shader programs on input data values to generate a desired set of output data, such as appropriately shaded and rendered fragment data in the case of a fragment shader, for processing by the rest of the graphics processing pipeline and/or for output.

It is also known to use graphics processors and graphics processing pipelines, and in particular the shader operation of a graphics processor and graphics processing pipeline, to perform more general computing tasks, e.g. in the case where a similar operation needs to be performed in respect of a large volume of plural different input data values. These operations are commonly referred to as "compute shading" operations and a number of specific compute APIs, such as OpenCL and Vulkan, have been developed for use when it is desired to use a graphics processor and a graphics processing pipeline to perform more general computing operations. Compute shading is used for computing arbitrary information. It can be used to process graphics-related data, if desired, but is generally used for tasks not directly related to performing graphics processing.

A graphics processor shader core is thus a processing unit that performs processing by running (typically small) programs for each "work item" in an output to be generated. In the case of generating a graphics output, such as a render target, such as a frame to be displayed, a "work item" in this regard is usually a vertex or a sampling position (e.g. in the case of a fragment shader). In the case of compute shading operations, each "work item" in the output being generated will be, for example, the data instance (item) in the work "space" that the compute shading operation is being performed on.

In graphics processor shader operation, including in compute shading operation, each work "item" will be processed by means of an execution thread which will execute the instructions of the shader program in question for the work item in question.

In some cases, execution threads (where each thread corresponds to one work item) are grouped together into "groups" or "bundles" of threads, where the threads of one group are run in lockstep, e.g. one instruction at a time. In this way, it is possible to share instruction fetch and scheduling resources between all the threads in the group, and thus can improve shader program execution efficiency.

The Applicants believe that there remains scope for further improvements in efficiency when executing (shader) programs within a graphics processor.

BRIEF DESCRIPTION OF THE DRAWINGS

A number of embodiments of the technology described herein will now be described by way of example only and with reference to the accompanying drawings, in which.

DETAILED DESCRIPTION

A first embodiment of the technology described herein comprises a graphics processor comprising:

a programmable execution unit operable to execute programs to perform processing operations, and in which when executing a program, the execution unit executes the program for respective groups of one or more execution threads;

an instruction cache that stores instructions for programs to be executed by the execution unit, wherein when executing a program for a respective group of one or more execution threads, the execution unit is arranged to fetch the instructions in the program from the instruction cache for execution; and an eviction checking circuit that is configured to, for an instruction being fetched for a respective group of execution threads from the instruction cache, before the instruction is executed:

determine whether the instruction includes one or more 'conditional eviction' conditions that if not met indicate that the program to which the instruction relates should not continue to be executed for the group of execution threads; and when it is determined that the instruction includes one or more 'conditional eviction' conditions that if not met indicate that the program to which the instruction relates should not continue to be executed for the group of execution threads, determine whether or not the 'conditional eviction' conditions are met;

wherein, in response to the determination whether or not the 'conditional eviction' conditions are met:

when it is determined that the 'conditional eviction' conditions are met, the eviction checking circuit allows the execution unit to continue execution of the program for the group of execution threads;

whereas when it is determined that the 'conditional eviction' conditions are not met, the eviction checking circuit causes the execution unit to evict the group of execution threads to which the instruction relates.

A second embodiment of the technology described herein comprises a method of operating a graphics processor, the graphics processor comprising:

a programmable execution unit operable to execute programs to perform processing operations, and in which when executing a program, the execution unit executes the program for respective groups of one or more execution threads; and an instruction cache that stores instructions for programs to be executed by the execution unit, wherein when executing a program for a respective group of one or more execution threads, the execution unit is arranged to fetch the instructions in the program from the instruction cache for execution;

the method comprising:

when an instruction is fetched for a respective group of execution threads from the instruction cache, before the instruction is executed:

determining whether the instruction includes one or more 'conditional eviction' conditions that if not met indicate that the program to which the instruction relates should not continue to be executed for the group of execution threads;

when it is determined that the instruction includes one or more 'conditional eviction' conditions that if not met indicate that the program to which the instruction relates should not continue to be executed for the group of execution threads, determine whether or not the 'conditional eviction' conditions are met; and in response to the determination whether or not the 'conditional eviction' conditions are met:

either:

continuing execution of the program for the group of execution threads when it is determined that the 'conditional eviction' conditions are met; or evicting the group of execution threads to which the instruction relates when it is determined that the 'conditional eviction' conditions are not met.

The technology described herein relates to the execution of programs within a programmable execution unit (e.g. shader) of a graphics processor.

In particular, the technology described herein relates to the handling of instructions in a (shader) program in the case where an instruction fetched for execution for a group of execution threads includes one or 'conditional eviction' conditions that if not met indicate that the program to which the instruction relates should not continue to be executed for the group of execution threads, and that according to the technology described herein may therefore cause the execution unit to evict the group of execution threads to which the instruction relates, e.g. as will be explained further below.

For example, in a typical graphics processor, there may be multiple groups of execution threads executing respective shader programs to perform related (graphics) processing operations for the same output. In that case, there may be various processing (e.g. data) dependencies between the processing operations being performed by the respective groups of execution threads, and these dependencies therefore need to be appropriately managed, e.g. to ensure the processing for the output is consistent across the different execution thread groups.

These dependencies can be (and in the technology described herein in an embodiment are) handled using one or more dependency counters (slots) that are maintained by the graphics processor and can be updated/cleared as the processing operations progress. Thus, in embodiments, the graphics processor is operable to track, e.g. by means of appropriate counters (slots), any dependencies for a (and the) threads of a thread group that is executing a shader program, and this dependency tracking is then used to determine whether there are any outstanding (unmet) dependencies for an instruction. Thus, an instruction having such a dependency may, e.g., and in an embodiment as part of the instruction itself, include a suitable dependency condition, e.g., in the form of a 'wait' modifier, e.g. that indicates which of the dependency counters (slots) need to be cleared before the (e.g.) next instruction in the program can be executed, and prevents the next instruction being executed (i.e. causes the program to wait) until the relevant dependency counters (slots) have cleared.

Thus, in an embodiment, when an instruction that is fetched for execution includes such a conditional dependency, this means that the next instruction in the program should not be executed until the relevant dependency counters (slots) have been checked/cleared.

In such cases, to prevent instructions that have outstanding (unmet) dependencies being executed, when an instruction is fetched for an execution thread group that includes such a dependency condition, e.g. indicating that the next (or a following) instruction in the program should not be executed, e.g., due to an outstanding dependency, rather than having the execution thread group to which the instruction relates wait for the dependency to clear (which may, e.g., take a number of cycles), the execution unit may be caused to evict the execution thread group in question.

This approach can therefore work well to provide an efficient utilisation of the execution unit. For instance, in a typical shader program the instructions must be executed in strict order, such that if the program must wait on a given instruction, the shader program cannot proceed until the action that is causing the wait has completed. Thus, if a shader program cannot progress, e.g. due to an outstanding dependency, it may be more efficient for the execution thread group to be evicted to allow the dependency to be checked, and then appropriately re-scheduled, such that another execution thread group can be scheduled on/to the execution unit accordingly.

For example, when an execution thread group is caused to be evicted, the evicted execution thread group can then, e.g., be returned to the thread group execution controller (scheduler) circuit such that the thread group can be re-scheduled on/to the execution unit at a later point, e.g., when the dependency is cleared, at which point the instruction can be executed, and the program can then progress beyond a processing barrier associated with the instruction in question (if any), e.g. and execute the next instructions in the (shader) program, e.g. to complete the data processing operation.

In the technology described herein, rather than, e.g., always evicting an execution thread group whenever an instruction includes one or more 'conditional' dependencies (eviction conditions) in order to allow the dependencies to be checked/updated, when it is determined during the instruction fetching that an instruction indicates one or more dependency conditions that need to be checked before the execution of the program can be continued (e.g. by proceeding to fetch the next instruction for execution), a further check is then performed at this point, to determine whether or not the dependency is already satisfied.

The technology described herein therefore relates to the situation where an instruction may include one or more 'conditional evict' conditions, such as a dependency that needs to be checked. Rather than always evicting the execution thread group to allow the conditions to be checked, the technology described herein includes an eviction checking circuit that is configured to determine whether or not the 'conditional evict' conditions are satisfied.

In response to this determination, when it is determined that the conditional eviction conditions are not met, e.g. such that the instruction indicates that there is a potentially outstanding (unmet) dependency on which the execution thread group is required to wait before executing the instruction, the execution thread group in question is evicted, e.g.

to clear its respective execution unit slots, such that a new execution thread group can be allocated to the execution unit in its place.

On the other hand, when it is determined based on this check that the conditional eviction conditions are already met at this point (such that the program can and should continue to be executed), the eviction checking circuit can therefore cause the execution unit to fetch the next instruction for execution, e.g. so that the execution of the program can be continued accordingly.

In this way it is possible to reduce instances of execution thread groups being evicted unnecessarily, and therefore provide an improved shader performance, e.g. as will be explained further below.

For example, in contrast to the technology described herein, one approach for handling such 'conditional eviction' conditions, e.g. dependencies, that need to be checked, would be to conservatively evict the respective execution thread group whenever an instruction is fetched that includes any 'conditional eviction' conditions. Thus, whenever an instruction is fetched for an execution thread group that includes a dependency condition, the execution thread group would always be evicted to allow the conditions to be checked.

However, in that case, there may be instances where an instruction causes an execution thread group to be evicted to allow a dependency condition to be checked when it would have been safe to continue execution of the program, e.g. since the dependency was already satisfied.

For example, in this approach, the execution thread group in question would always be evicted whenever there is a dependency that needs to be checked. However, the technology described herein recognises that it can often be the case that the dependency may already be satisfied at the point when the instruction is fetched, in which case the program execution can safely continue, e.g. with the next instruction being fetched for execution at that time.

Thus, in some cases, the conservation eviction approach described above may result in execution thread groups being evicted, with the execution thread group thus having to be re-scheduled, etc., when it would in fact have already been safe to fetch the next instruction and continue execution of the program. This unnecessary evicting of the execution thread can thus introduce latency, thereby reducing the shader performance.

Evicting an execution thread group also has an associated cost in terms of register bandwidth. For example, each execution thread, when executing a shader program, is in an embodiment allocated a set of one or more registers for use by that thread when executing the shader program. When a group of execution threads is evicted, e.g. to check a dependency slot, its registers are in an embodiment then written back, e.g., to a register file. Thus, also for this reason, e.g. to save register bandwidth, it is desirable to reduce instances of execution threads being unnecessarily evicted.

The technology described herein thus recognises that the above approach where execution thread groups are conservatively evicted and re-scheduled whenever there is an outstanding dependency can, in some cases, be relatively inefficient.

In contrast, in the technology described herein, by providing an eviction checking circuit that is operable and arranged to check instructions as they are fetched to determine whether any 'conditional eviction' conditions associated with the instruction are satisfied, it is possible to reduce the number of instances of execution thread groups being evicted unnecessarily.

In the graphics processor of the technology described herein, the instructions are stored in a suitable instruction cache (e.g. an instruction cache local to the graphics processor) from which they can be fetched for execution for the execution thread groups executing in the execution unit.

Thus, as will be explained further below, the graphics processor is operable to spawn execution thread groups for executing respective shader programs, with the execution thread groups then being scheduled on/to the execution unit for execution. When an execution thread group is scheduled on/to the execution unit, the execution unit is then arranged to fetch the relevant instructions for execution for the execution thread group from the instruction cache. In embodiments, when the execution unit issues a request for a (the next) instruction for an execution thread group, in parallel to the instruction being provided to the execution thread, the eviction checking circuit is arranged to check the fetched instruction at this point, as the instruction is being fetched for execution.

In this way, the eviction checking circuit is able to check instructions as they are issued to the execution unit for execution for a respective execution thread group. In an embodiment the eviction checking circuit is part of the execution unit itself. However other (logical) arrangements would be possible.

According to the technology described herein this check is in an embodiment performed in two parts, as will be explained further below.

Firstly, it is checked whether the instruction includes any conditions that may require the execution thread group to be evicted.

This may be a 'conditional eviction' condition, such as a dependency, that needs to be satisfied before the execution of the program can continue. For example, as described above, in an embodiment, an instruction may include a 'conditional eviction' condition, such as a dependency, that if not met indicates that the next (following) instruction in the program should not be executed. In this way, by adding the 'conditional eviction' condition (e.g. dependency) into the preceding instruction, this means that where there is an outstanding dependency that means the next instruction should not be executed, it is not necessary to fetch the next instruction (and therefore the next instruction is in an embodiment not fetched). However, other arrangements would be possible and it would also be possible, for example, for a 'conditional eviction' condition included in an instruction to indicate that the instruction itself should not be executed until the 'conditional eviction' condition is met (rather than indicating that the next instruction should not be executed).

Furthermore, there may also be various other conditions associated with an instruction that may cause eviction of the execution thread group.

In particular there may be certain conditions that, if present, mean that the execution thread group should always be evicted, regardless of any other, e.g., dependency conditions.

For example, it may also be desirable to evict the group of execution threads executing a program when (and whenever) the program includes a messaging instruction. For instance, in some embodiments, messaging instructions are not executed by the (same) execution unit, and so when the program includes a messaging instruction, the execution thread group should always be evicted. This may be suitably indicated as part of the instruction itself such that the instruction check circuit is able to determine from a (the current) instruction whether the instruction corresponds to a messaging instruction. Or, in some embodiments, this may be indicated in the previous instruction, e.g. such that the instruction check circuit is able to determine from a (the current) instruction whether the next instruction in the program corresponds to a messaging instruction. In either case, when it is determined that the current or next instruction corresponds to a messaging instruction, the execution unit may trigger an unconditional eviction of the execution thread group (i.e. regardless of whether there are any outstanding processing dependencies).

Thus, in embodiments the execution unit may be configured to always (unconditionally) evict the execution thread group either when the fetched instruction corresponds to a messaging instruction or when the fetched instruction indicates that the next instruction in the program corresponds to a messaging instruction.

Another example of where it may be desired to always trigger eviction of the execution thread group would be when the instruction is a branch instruction. For example, in that case, after the branch instruction has been executed, it may be desired (or necessary) to evict the execution thread group so that the shader program can be re-scheduled appropriately to execute a different instruction sequence, e.g. for the new branch. Similarly, where an execution thread group has diverged, it may be desirable (or necessary) to evict the execution thread group to perform a branch re-convergence check, and this may therefore also trigger an unconditional eviction of the execution thread group.

A further example of where it may be desired to unconditionally evict an execution thread group would be when it can be determined that the work item to which the program being executed by the group of execution threads relates can be discarded, e.g. since it will not contribute to the output. For example, in graphics processing operations, this may occur when a graphics fragment to which the shader program relates is fully occluded by an earlier processed fragment. In that case, the graphics fragment can be suitably culled, and the shader program can be terminated early (with the execution thread group evicted accordingly). Any such fragment culling operations may be tracked separately, and a separate check can then be performed to determine whether the work item to which the shader program that the instruction is part of can be discarded, in which case the execution unit may be caused to evict the execution thread group regardless of the result of any other (e.g. dependency) checks that are performed.

Thus, whenever the instruction is associated with such conditions, the execution unit may be caused to unconditionally evict the execution thread group. The presence of such 'unconditional eviction' conditions can thus be indicted to the execution unit, to thereby cause the execution unit to evict the execution thread group appropriately.

In such cases, even if the instruction (also) includes one or more dependency conditions, there is no need to check whether the dependency conditions are satisfied, as the execution thread group should anyway be evicted.

That is, the determination of whether the instruction includes one or more 'conditional eviction' conditions, and hence the subsequent determination of whether any such 'conditional eviction' conditions are met, is itself in an embodiment conditional on whether there are any 'unconditional eviction' conditions.

Thus, in embodiments, the eviction checking circuit is further configured to determine whether the instruction is associated with any unconditional eviction conditions that if present indicate the group of execution threads to which the instruction relates should always be evicted.

In that case, the eviction checking circuit is in an embodiment configured to determine whether the instruction includes any unconditional eviction conditions prior to determining whether the instruction includes one or more conditional eviction conditions. When it is determined that the instruction includes any unconditional eviction conditions, the eviction checking circuit in an embodiment then causes the execution unit to evict the group of execution threads without checking whether the instruction includes one or more conditional eviction conditions or whether any conditional eviction conditions are met.

On the other hand, in response to determining that the instruction is not associated with any such 'unconditional eviction' conditions, it is in an embodiment then checked whether the instruction includes any 'conditional eviction' conditions, and when it is determined that the instruction does include one or more 'conditional eviction' conditions, according to the technology described herein, a further check is then performed to check whether or not the 'conditional eviction' conditions have been satisfied (met).

That is, when it is determined that there are one or more 'conditional eviction' conditions that may still need to be checked for an instruction (e.g. since there are no other 'unconditional eviction' conditions that would otherwise cause the execution thread group to be evicted), the eviction checking circuit is arranged to determine whether the dependency conditions are actually satisfied at this point, e.g. rather than simply evicting the execution thread group in the more conservative fashion discussed above.

When it is determined that the 'conditional eviction' conditions are not satisfied, the eviction checking circuit then causes the execution unit to evict the execution thread group accordingly, e.g. after executing the current instruction, e.g. to allow the execution thread group to be appropriately re-scheduled, e.g. when the 'conditional eviction' conditions are met.

However, when it is determined based on this further check that the 'conditional eviction' conditions are in fact already met, the 'conditional eviction' conditions can effectively be ignored, and the execution unit can therefore (and does) continue executing the program, e.g. by fetching the next the instruction for execution, without evicting the execution thread group.

(Any instructions for which the previous instruction did not include any such unconditional or conditional eviction conditions (either because there are no such conditions, or because any conditional eviction conditions (e.g. dependencies) have already cleared) may of course be fetched and executed, e.g. as normal.)

Thus, the technology described herein is able to check instructions as they are being issued to the execution unit for execution. It can accordingly be determined based on this pre-execution instruction check whether there are any conditions that mean that the execution thread group should be evicted. Furthermore, where an instruction includes one or more 'conditional eviction' conditions (e.g. dependencies) that need to be cleared before the program execution can continue, it can be determined at this point whether the condition (dependency) is already satisfied, in which case the condition (dependency) can be safely ignored, with the next instruction then being fetched for execution, etc., without having to evict the execution thread group.

The technology described herein can thus reduce the number of instances where execution thread groups are unnecessarily evicted, e.g. where an execution thread group is evicted even when it would have been safe to continue execution of the program, e.g. as the instruction check circuit allows any dependencies, or other such possible 'conditional eviction' conditions associated with an instruction that might otherwise cause the execution thread group to be evicted, to be checked (in full) at this point, as the instructions are being fetched for execution.

This then means that if a, e.g., data dependency indicated by an instruction is already satisfied, there is no need to evict the execution thread group to check that this is the case (as would be done in some existing graphics processors), and the program execution can be safely continued at that time, without evicting the execution thread group. The technology described herein may therefore provide an improved, more efficient shader operation.

Furthermore, this eviction check can be implemented (entirely) in microarchitecture, e.g. by providing a suitable lookup interface that allows instructions to be checked as they are fetched from the instruction cache, and, e.g., and in an embodiment, without having to modify the instruction set.

The technology described herein may therefore provide various improvements in this respect.

The graphics processor that is operated in the manner of the technology described herein can be any suitable and desired graphics processor (graphics processing unit, GPU) that includes one or more programmable execution unit.

The graphics processing unit may perform any suitable and desired form of graphics processing, such as rasterisation-based rendering, ray-tracing, hybrid ray-tracing etc.

The execution unit of the graphics processor can be any suitable and desired execution unit that is operable to execute shader programs.

The graphics processor may comprise a single execution unit, or may have plural execution units. Where there are plural execution units, each execution unit can, and in an embodiment does, operate in the manner of the technology described herein.

Where there are plural execution units, each execution unit may be provided as a separate circuit to other execution units of the graphics processor, or the execution units may share some or all of their circuits (circuit elements).

For instance, in embodiments the eviction check circuit is part of the execution itself. Where there are plural execution units, each execution may therefore have its own eviction check circuit. However, it would also be possible for plural execution units to share an eviction check circuit.

The (and each) execution unit should, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store type units (such as blend or store units), etc.

In the case where execution threads can be grouped into thread groups ("warps"), as will be explained further below, the functional units, etc., of a given programmable execution unit are in an embodiment configured and operable so as to facilitate such thread group arrangements. Thus, for example, the functional units are in an embodiment arranged as respective execution lanes, one for each thread that a thread group (warp) may contain (such that, for example, for a system in which execution threads are grouped into groups (warps) of eight threads, the functional units may be operable as eight respective (and identical) execution lanes), so that the programmable execution unit can execute the same instruction in parallel for each thread of a thread group (warp).

The graphics processor in an embodiment also comprises any other appropriate and desired units and circuits required for the operation of the programmable execution unit(s), such as appropriate control circuits (control logic) for controlling the execution unit(s) to cause and to perform the desired and appropriate processing operations.

Thus the graphics processor in an embodiment also comprises an appropriate thread group execution controller (scheduler) circuit, which is operable to issue thread groups to the programmable execution unit for execution and to control the scheduling of thread groups on/to the programmable execution unit for execution.

In an embodiment, the graphics processor comprises one or more of, and in an embodiment all of: an instruction decode circuit or circuits operable to decode instructions to be executed; an instruction issue circuit or circuits operable to issue instructions to be executed to the programmable execution unit so as to cause the execution unit to execute the required instructions for a thread group; an instruction fetch circuit or circuits operable to fetch instructions to be executed (prior to the decode circuit(s)); an instruction cache for storing instructions locally to the programmable execution unit for execution by execution threads being executed by the programmable execution unit; an execution thread generator (spawner) circuit that generates (spawns) (groups of) threads for execution; and an execution thread scheduler circuit that schedules (groups of) threads for execution (this may be part of the thread generator).

The program that is being executed in the technology described herein can be any suitable and desired program that can be executed by a graphics processor. For example, the program may be any suitable and desired shader program that can be executed by a graphics processor, such as a geometry shader program, a vertex shader program, a fragment shader program, a compute shader program, or any other form of shader program that is supported by a graphics API.

The group of one or more execution threads can be any suitable and desired group of one or more execution threads. The technology described herein can be applied in the case of, and to, individual threads (in which case the group of one or more execution threads will comprise a single execution thread) (and in one embodiment that is the case).

In an embodiment, the group of one or more execution threads comprises plural (two or more) execution threads, such as four, eight or sixteen (or more, such as 32, 64 or 128) execution threads.

For example, in embodiments, to improve shader program efficiency, execution threads (where each thread corresponds to one work item) are grouped into "groups" or "bundles" of threads, where the threads of one group are run in lockstep, e.g. one instruction at a time. In this way, it is possible to share instruction fetch and scheduling resources between all the threads in the group. (Other terms used for such thread groups include "warps" and "wave fronts". For convenience, the term "thread group" will be used herein, but this is intended to encompass all equivalent terms and arrangements, unless otherwise indicated.)

Thus, in an embodiment, the graphics processor and the programmable execution unit is operable to execute shader programs for groups ("warps") of plural execution threads together, in lockstep, one instruction at a time, and the group of one or more execution threads for which execution of the shader program is suspended comprises such a thread group (warp).

In an embodiment, the group of one or more execution threads comprises plural execution threads, and corresponds to a thread group (warp) that is executing the shader program in lockstep.

The actual data processing operations that are performed by the shader execution unit when executing that shader program are usually performed by respective functional units (circuits), such as arithmetic units (circuits), of the execution unit, in response to, and under the control of, the instructions in the (shader) program being executed. Thus, for example, appropriate functional units, such as arithmetic units, will perform data processing operations in response to and as required by instructions in a (shader) program being executed.

When executing an instruction in a program, the execution unit (e.g. the appropriate functional unit, such as an arithmetic unit, of the execution unit) will typically read one or more input data values (operands), perform a processing operation using those input data values to generate an output data value, and then return the output data value, e.g. for further processing by subsequent instructions in the program being executed and/or for output (for use otherwise than during execution of the program being executed).

The input data values to be used when executing the instruction will typically be stored "locally" in an appropriate set of registers (a register file) of and/or accessible to the execution (functional) unit, and the output data value(s) generated by the execution (functional) unit when executing the instruction will correspondingly be written back to that storage (register file).

To facilitate this operation, each execution thread, when executing a shader program, will correspondingly be allocated a set of one or more registers for use by that thread when executing the shader program.

Thus when executing an instruction, an execution thread will read input data values (operands) from a register or registers of a set of one or more registers allocated to that thread, and write its output value(s) back to a register or registers of the thread's register allocation.

The data will be loaded into the registers, and written out from the registers, from and to an appropriate memory system of or accessible to the graphics processor (e.g. via an appropriate cache system (cache hierarchy)).

Thus, as well as the programmable execution unit, the graphics processor in an embodiment includes a group of plural registers (a register file) operable to and to be used to store data for execution threads that are executing. Each thread of a group of one or more execution threads that are executing a shader program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

Where there are plural execution units, each execution unit may have its own distinct group of registers (register file), or there may be a single group of registers (register file) shared between plural (e.g. some or all) of the separate execution units.

The group(s) of registers (register file(s)) can take any suitable and desired form and be arranged in any suitable and desired manner, e.g., as comprising single or plural banks, etc.

The graphics processor will correspondingly comprise appropriate load/store units and communication paths for transferring data between the registers/register file and a memory system of or accessible to the graphics processor (e.g., and in an embodiment, via an appropriate cache hierarchy).

As explained above, the graphics processor further includes an instruction cache for storing instructions for the shader programs that are being executed for the respective groups of execution threads. The execution unit is thus arranged to fetch instruction from the instruction cache.

The set (sequence) of instructions being executed for the program can be any desired and suitable instructions. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store type instructions (such as blend or store instructions).

At least some of the instructions in a given shader program may comprise one or more 'wait' modifiers, e.g. that prevent the execution of the program continuing until one or more conditions (e.g. specified by the wait modifier) are met. In particular, an instruction may include a 'wait' modifier that prevents the next instruction in the program being fetched/executed until one or more conditions (e.g. specified by the wait modifier) are met.

For example, in typical processing operations, when generating a given output, there may be a number of execution thread groups that are performing related data processing operations in parallel. This means that there may be various processing dependencies that need to be appropriately handled. An (and each) instruction may therefore have an associated 'wait' modifier indicating that the execution of the program should not be continued (i.e. should wait) until one or more dependencies are satisfied.

The wait modifier may then cause the execution unit to check the associated one or more dependencies indicated by the wait modifier included for the instruction to determine whether there are any outstanding dependencies. If there are no outstanding dependencies, the program execution can be safely continued, and this is therefore done. On the other hand if there are any outstanding dependencies, it is not safe to continue executing the program, and the group of execution threads executing the program to which the instruction relates should be (and is) evicted.

These dependencies can be tracked, for example, using appropriate dependency counters (slots) that track and count outstanding dependencies and indicate when those dependencies have been met. The dependency counters (slots) can therefore be incremented/decremented as appropriate, e.g. such that when a dependency is met, the counter (slot) is set to zero (cleared). When all of the dependencies have cleared, the execution unit can then determine that it is safe to execute the instruction. On the other hand if the dependency counter for any of the dependencies on which the execution of the program is waiting is non-zero (has not been cleared) the execution threads should be evicted and the execution thread group should be rescheduled appropriately.

As mentioned above, when an instruction includes one or more 'conditional eviction' conditions, such as dependencies, that are not satisfied, in response to the eviction checking circuit determining that the conditional eviction' conditions are not met, the execution unit is caused to evict the group of execution threads executing the program to which the instruction relates (e.g., and in an embodiment, after the current instruction has been executed, as will be explained further below).

There may also be other conditions that cause the execution unit to evict the group of execution threads. In particular, and as mentioned above, there may be certain 'unconditional eviction' conditions that will always cause the execution thread group to be evicted whenever they are present, e.g., and regardless of whether there are any dependency conditions.

Thus, in embodiments, even if all of the, e.g., dependencies associated with an instruction are satisfied, such that there is no dependency barrier preventing safe execution of the program, there may still be various other conditions that are present that mean that the group of execution threads should be evicted.

Various examples of such conditions include where the program includes a messaging instruction, or a branch instruction.

In such cases there is no need to check any dependencies (and in an embodiment this is not done).

On the other hand, so long as there are no such 'unconditional eviction' conditions, whenever an instruction includes one or more 'conditional eviction' conditions (e.g. an outstanding dependency), rather than simply evicting the execution thread group at this point, a further check is performed to determine whether or not the more 'conditional eviction' condition (e.g. dependency) is satisfied, and when the condition (e.g. dependency) is already satisfied (such that the program execution can be safely continued), the condition (e.g. dependency) is then ignored.

Thus, in the technology described herein, the fetched instructions are checked to determine whether they include any conditions that may or should cause an execution thread group to be evicted, and based on these checks, the execution unit is then caused to continue executing the program (e.g. by fetching/executing the next instruction in the program), or to evict the execution thread group, accordingly.

In an embodiment the instructions are checked as they are fetched for execution, e.g. as they are read out from the instruction cache. In an embodiment the check is performed in parallel with providing the instructions into an instruction execution buffer of the execution unit.

For example, in embodiments, the execution unit, when executing a program, fetches the instructions in the program in sequence from the instruction cache. The fetched instructions are then provided from the instruction cache to the execution unit for execution, and in an embodiment allocated into a respective instruction buffer of the execution unit for execution by the respective execution thread group.

At the same time, as the instructions are fetched, a look-up is in an embodiment performed to check whether one or more conditions that would cause the execution thread group to be evicted are satisfied. The result of this instruction check can then be provided to the execution unit to cause the execution thread group to either continue execution of the program (e.g. by fetching the next instruction) or to cause the execution thread group to be evicted, e.g. as described above.

In an embodiment each and every instruction is checked as it is fetched. Thus, whilst embodiments described above in relation to checking a single instruction, it will be appreciated that this may be done for every instruction that is fetched.

The instructions may be, and in an embodiment are, checked individually. However, in some cases, it may be desirable to check (at least some) conditions at a coarser level, e.g. for a block of plural instructions.

Thus, in embodiments, the step of checking an instruction comprises checking one or more conditions associated with a set of one or more instructions including the instruction, Thus, any references to fetching/checking/executing an instruction may in embodiments refer to fetching/checking/executing a set of one or more instructions.

Where there are multiple conditions that may cause an execution thread group to be evicted, the eviction checking circuit in an embodiment checks all of the conditions. The determination of whether to evict an execution thread group is made based on a determination of whether, e.g., and in an embodiment, which of, the one or more conditions associated with the instruction are satisfied.

For example, the graphics processor may manage a plurality of data dependency counters (slots), only some (a subset) of which apply for the instruction in question. In some embodiments, the check is thus performed to only check the dependency counters (slots) that actually apply to the instruction. This will provide the best results (e.g. the fewest unnecessary evictions). However, in some cases, it may be desired to simply check all of the dependency counters (slots), without regard for whether or not they actually apply to the instruction in question, and this is done in some embodiments. For example, this approach can simplify the checking, which may be particularly beneficial when there are a large number of checks that need to be performed in parallel.

Thus, in embodiments, when it is determined that the instruction includes one or more dependency conditions that need to be checked before the program execution can continue the eviction checking circuit is configured to check the dependency counters for all of the dependency conditions that are being tracked without checking if the respective dependency conditions apply to the instruction in question and to evict the group of execution threads executing the program to which the instruction relates when it is determined that any of the dependency conditions that are being tracked by the dependency counters are not met.

When it is determined based on the eviction check that the next instruction can and should be executed (the program can continue to be executed), the instruction is pushed to the instruction (execution) buffer for execution by the execution thread group, and the execution unit is then caused to fetch the next instruction in the program. In this way, the execution unit is able to effectively ignore any wait modifier that would otherwise cause the execution thread group to be evicted.

On the other hand, when it is determined based on the eviction check that the next instruction cannot or should not be executed (the program cannot continue to be executed), and that the execution thread group should instead be evicted, the instruction is in an embodiment pushed to the instruction (execution) buffer for execution by the execution thread group, but rather than the execution unit then proceeding to fetch the next instruction in the program, the eviction checking circuit triggers eviction of the execution thread group.

In an embodiment the eviction of the execution thread group is triggered by marking the instruction in question as the 'final' instruction in the program. This then means that when the execution threads reach the instruction the shader program will finish and the execution thread group will be evicted appropriately (e.g. without fetching the next instruction). The execution thread group will thus be deallocated and a new execution thread group will be spawned in its place on the next fetching instruction.

Thus, in embodiments, when it is determined based on the determination of whether the one or more conditions associated with the instruction are satisfied that the program should not continue to be executed, the (current) instruction is marked as the 'last' instruction in the program to trigger an eviction of the group of execution threads executing the program to which the instruction relates when the execution unit executes the instruction.

Other arrangements for evicting an execution thread group would be possible.

For example, rather than waiting until the program execution reaches the instruction that triggers the eviction, the eviction check circuit could trigger an immediate eviction of the execution thread group. Thus, in embodiments, in some cases, when it is determined based on the determination of whether the one or more conditions associated with the instruction are satisfied that the program should not continue to be executed, the group of execution threads executing the program to which the instruction relates may be immediately evicted.

When an execution thread group is evicted, it is in an embodiment provided to an appropriate thread group execution controller (scheduler) circuit, such that the shader program execution for the thread group can be restarted at a later point, as desired. Thus, in embodiments, when it is determined that the execution thread group should be evicted due to one or more outstanding data dependencies, the execution thread group is passed to a thread group execution controller (scheduler) circuit. In that case, the execution thread group is in an embodiment subsequently re-scheduled.

In embodiments, when a thread group is evicted due to one or more 'conditional eviction' conditions, e.g. dependencies, that are not met, the execution thread group may then be placed in a respective queue associated with the one or more conditions in question, along with any other thread groups that are waiting on the conditions. When the condition is met, the queue can then be released and re-scheduled appropriately.

However other re-scheduling mechanisms could also be used. For example, it would also be possible to simply re-schedule the execution thread group immediately, such that the execution thread group is placed into a queue of execution thread groups to be executed, and have the condition checked again when the execution thread group is re-issued for execution (although in that case the execution thread group may therefore be repeatedly evicted/re-scheduled, which may be inefficient).

To facilitate the re-scheduling operation, when an execution thread group is evicted, its associated register content is in an embodiment written out, e.g. to allow the shader program to be resumed appropriately.

Various arrangements would be possible in that regard.

In some embodiments, the graphics processor comprises, and/or is in communication with, one or more memories and/or memory devices that store the data described herein, and/or store software for performing the processes described herein. The graphics processor may also be in communication with a host microprocessor, and/or with a display for displaying images based on the data generated by the graphics processor.

In an embodiment, the graphics processor is part of an overall data processing system that comprises one or more memories and/or memory devices and a host processor (and, optionally, a display). In an embodiment, the host microprocessor is operable to execute applications that require data, e.g. graphics, processing by the graphics processor, with the graphics processor operating when required to perform processing for applications executing on the host processor.

Other arrangements would, of course, be possible.

The technology described herein can be used for all forms of output that a graphics processor (and processing pipeline) may be used to generate, such as in the case of a graphics processing operations frames (images) for display, render to texture outputs, etc. The output data values from the processing are in an embodiment exported to external, e.g. main, memory, for storage and use, such as to a frame buffer for a display.

The technology described herein is applicable to any suitable form or configuration of graphics processor and data processing system. In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments will now be described in the context of a graphics processor operable to execute graphics shader programs.

Figure 1:
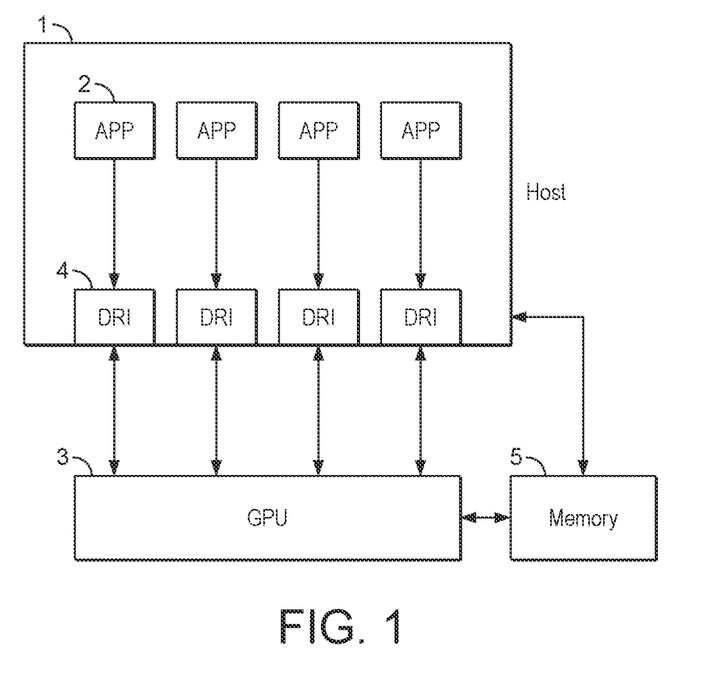
FIG. 1 shows an exemplary computer graphics processing system.

FIG. 1 shows a typical computer graphics processing system.

An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final output, e.g. frame that is displayed.

Figure 2:
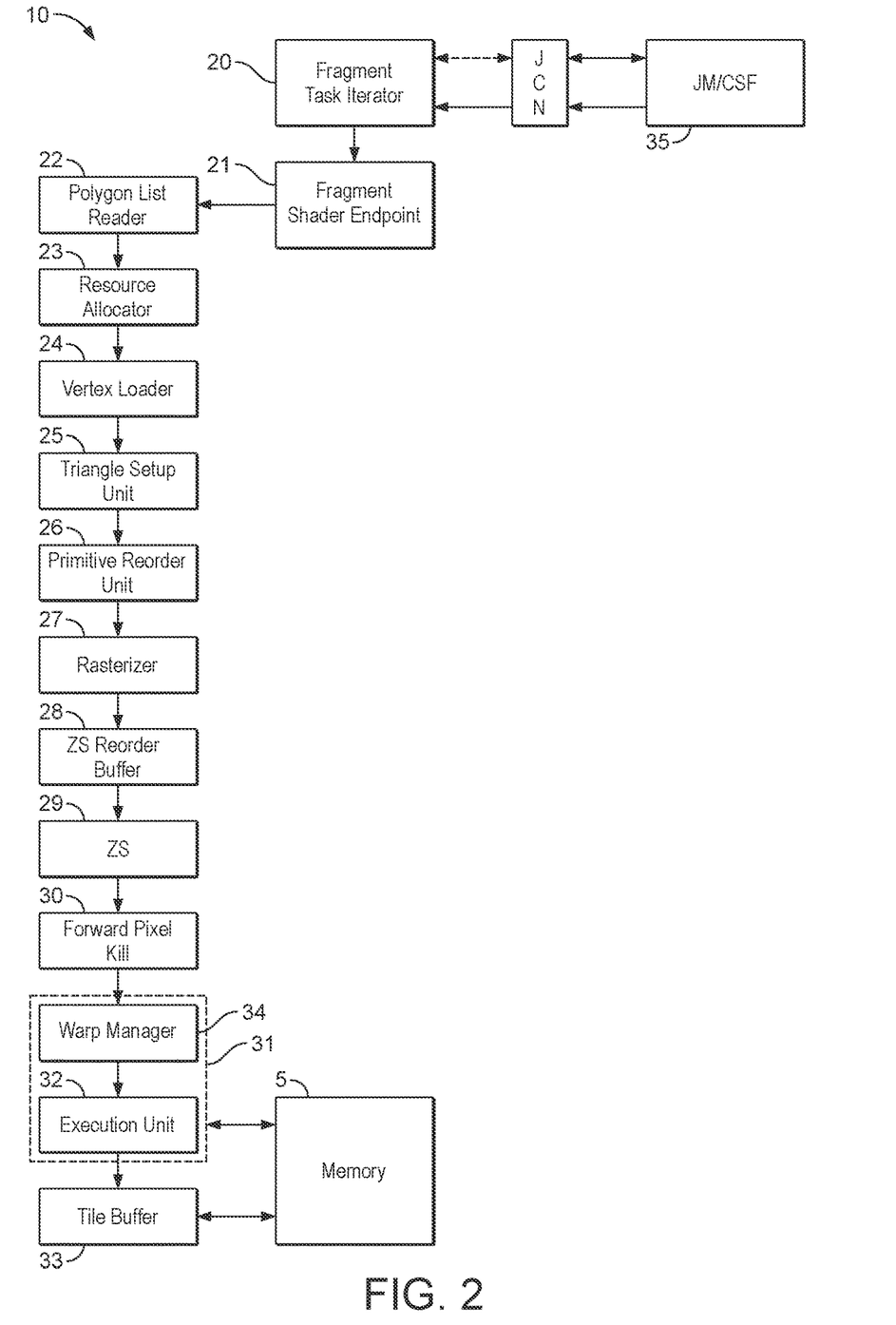
FIG. 2 shows an exemplary graphics processing pipeline.

FIG. 2 shows an exemplary graphics processing pipeline 10 that may be executed by the graphics processor 3 in the present embodiment. The graphics processing pipeline 10 shown in FIG. 2 is a tile-based system, and will thus produce tiles of an output data array, such as an output frame to be generated. (The technology described herein is however also applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline 10 according to the present embodiments. As will be appreciated by those skilled in the art, there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by the graphics processing unit (GPU) (graphics processor) 3, which will accordingly include the necessary functional units, processing circuits, etc., operable to execute the graphics processing pipeline stages.

FIG. 2 shows the stages of the graphics processing pipeline after a tiler (not shown) of the graphics processor has prepared the primitive lists (as the graphics processing pipeline 10 is a tile-based graphics processing pipeline).

(The tiler in effect determines which primitives need to be processed for different regions of the output. In the present embodiments, these regions may, e.g., represent a tile into which the overall output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.)

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 2.

A fragment task iterator 20 is thus provided that schedules processing work to the graphics processing pipeline 10.

The fragment task iterator 20 may thus schedule the graphics processing pipeline to generate a first output, which may, e.g. be a frame to display. In the present embodiments, wherein the graphics processing pipeline 10 is a tile-based system, in which the output has been divided into a plurality of rendering tiles, the graphics processing pipeline 10 iterates over the set of tiles for the first output, rendering each tile in turn.

As shown in FIG. 2, the graphics processor 3 includes an overall controller in the form of a job manager circuit (a command stream frontend circuit) 35, that is operable to receive tasks for the graphic processor 3 for processing from the host processor 1, which job manager 35 can then communicate the relevant jobs (tasks) to respective elements of the graphics processor and graphics processing pipeline 10, via an appropriate bus/interconnect, which in the present embodiment is in the form of a job control network (JCN) 36.

Thus, as shown in FIG. 2, the job manager 35 will, inter alia, issue fragment processing tasks to the fragment task iterator 20 for the fragment task iterator 20 to then schedule the appropriate fragment shading tasks to and onto the graphics processing pipeline 10.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers 33 for the tile of the output that is being generated. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

Before the primitives are passed to the rasteriser 27 the primitives may desirably be re-ordered, e.g. to improve the rasterisation efficiency, hidden surface removal, etc. Thus, the graphics processing pipeline 10 includes a primitive re-order unit 26 containing a buffer of primitives that may be subject to re-ordering.

The edge information for the re-ordered primitives is then passed to the rasteriser 27, which rasterises the primitives into a set of one or more sampling points and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

To facilitate this, the fragments may be subject to further re-ordering in a ZS re-order buffer 28 upstream of the Z/stencil testing stage 29.

Fragments that pass the fragment early Z and stencil test stage 29 may then be subject to further culling operations, such as a 'forward pixel kill' test 30, e.g. as described in United States Patent Application Publication No. 2019/0088009 (Arm Limited), before the remaining fragments are then passed to a fragment shading stage, in the form of a shader core 31, for rendering.

The fragment shading stage 31 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs for the fragments, applying textures to the fragments, applying fogging or other operations to the fragments, etc., to generate the appropriate rendered fragment data.

In the present embodiment, the fragment shading stage is in the form of a shader pipeline (a programmable fragment shader), and thus is implemented by means of an appropriate shader (processing) core 31.

Thus, as shown in FIG. 2, in the present embodiment, the fragment shading stage (shader core) 31 includes a programmable execution unit (engine) 32 operable to execute fragment shader programs for respective execution threads (where each thread corresponds to one work item, e.g. an individual fragment, for the output being generated) to perform the required fragment shading operations to thereby generate rendered fragment data. The execution unit 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 2 accordingly also shows a thread group controller, in the form of a warp manager 34, that is configured to control the allocation of work items (e.g. fragments) to respective thread groups for the fragment shading operations to be performed by the execution unit 32, and the issuing of thread groups to the execution unit 32 for the execution of the fragment shading programs by respective thread groups.

As shown in FIG. 2, the fragment shading stage (shader core) 31 is also in communication with the memory 5.

Once the fragment shading is complete, the output rendered (shaded) fragment data is written to the tile buffer 33 from where it can, for example, be output to a frame buffer (e.g. in the memory 5) for display. The depth value for an output fragment is also written appropriately to a Z-buffer within the tile buffer 33. (The tile buffer stores colour and depth buffers that store an appropriate colour, etc., or Z-value, respectively, for each sampling point that the buffers represent (in essence for each sampling point of a rendering tile that is being processed).) These buffers store an array of fragment data that represents part (a tile) of the overall output (e.g. image to be displayed), with respective sets of sample values in the buffers corresponding to respective pixels of the overall output (e.g. each 2×2 set of sample values may correspond to an output pixel, where 4× multi-sampling is being used).

As mentioned above, the tile buffer 33 is normally provided as part of RAM that is located on (local to) the graphics processor.

Once a tile for the output has been processed, the data from the tile buffer(s) may thus be written back to an external memory output buffer, such as a frame buffer of a display device (not shown), e.g. in the memory 5. (The display device could comprise, e.g., a display comprising an array of pixels, such as a computer monitor or a printer.)

The next tile is then processed, and so on, until sufficient tiles have been processed to generate the entire output (e.g. frame (image) to be displayed). The process is then repeated for the next output (e.g. frame) and so on.

In typical fragment shader operation, there may be multiple groups of execution threads executing respective fragment shader programs for fragments within the same output (e.g. frame).

In that case, there may be various processing (e.g. data) dependencies between the fragment shader programs, and these dependencies therefore need to be appropriately managed, e.g. to ensure the processing for the output is consistent across the different execution thread groups.

Similar dependencies may exist for other shader operations, such as geometry shader program, a vertex shader program, a compute shader program, or any other form of shader program that is supported by a graphics API. Such dependencies can be handled using one or more dependency slots that are managed by a suitable dependency counter. Thus, an instruction, where it has a processing dependency, may include a suitable 'wait' modifier, e.g. that indicates which of the dependency slots need to be cleared before the program execution is continued, and that prevents the next instruction in the program from being fetched/executed (i.e. causes the program to wait) until the relevant dependency slots have cleared.

An example of a typical shader program including an instruction that contains such a wait modifier is given below:

LOAD.32.slot0 @r20, addr #increment dep slot 0
FMA r10, r0, r1, r2
FMA r11, r2, r3,r10
FMA.wait0 r12, r4, r5,r11
FMA r13, r20, r2, r12

In this example the shader program includes a first load instruction that is configure to load the working set to an associated register file. A dependency slot (dep slot '0') is incremented.

A number of arithmetic operations (which in this example are fused multiply-add (FMA) operations) are then performed with the results being written back to the register, e.g. in the normal manner for shader program execution. The third arithmetic operation however includes a wait modifier ('wait0') that causes the execution unit to not execute the next (fourth) instruction in the program until the indicated dependency slot (dep slot '0') has been cleared (e.g. set to zero) (a message response will decrement that slot eventually).

In such cases, the execution unit may be configured to evict the execution thread group, rather than waiting for the dependency to clear, to allow a new execution thread group to be scheduled.

As will be explained further below, the present embodiment is particularly concerned with the such eviction mechanisms.

Figure 3:
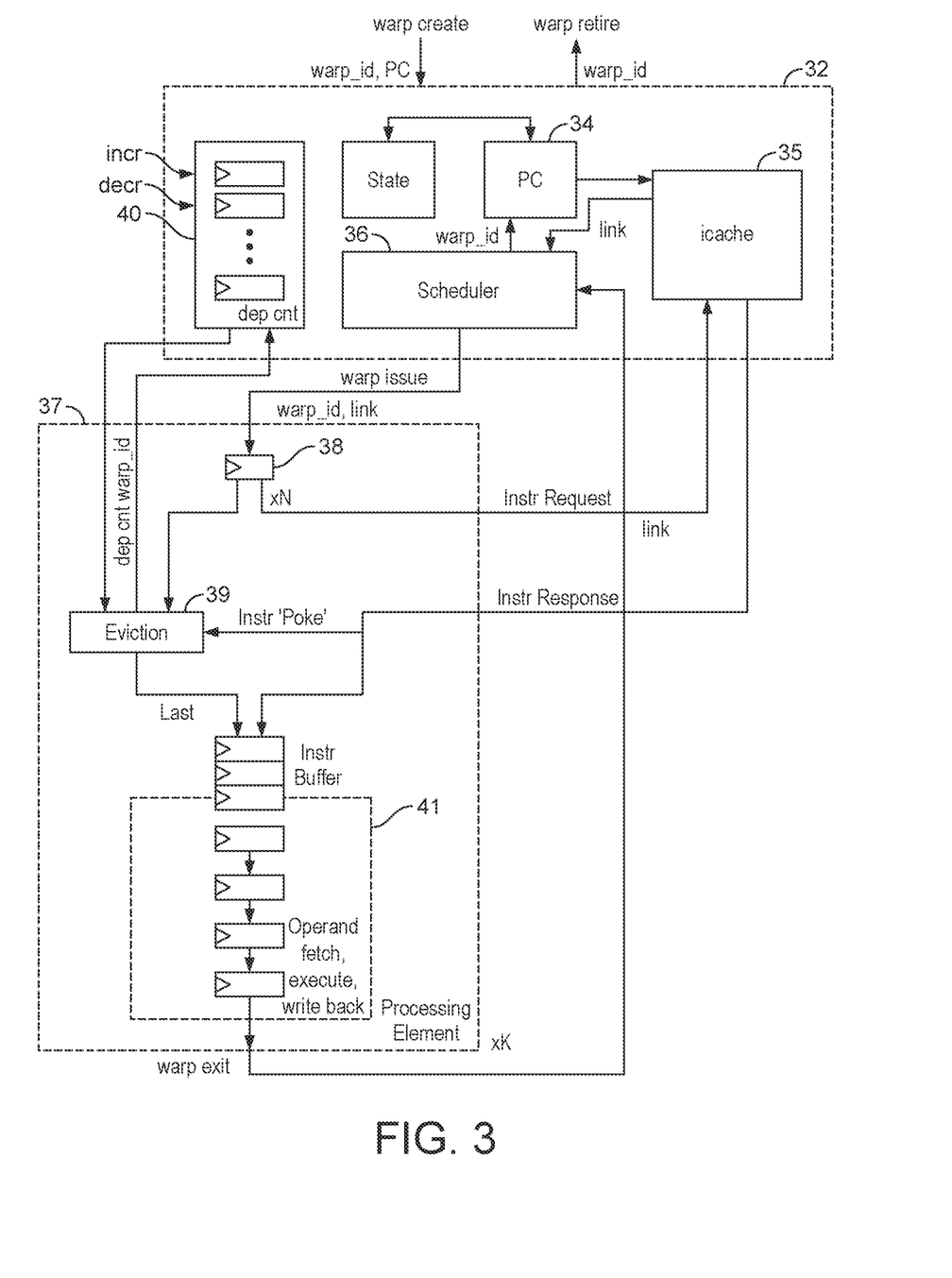
FIG. 3 shows schematically the operation of a shader core of a graphics processor in an embodiment of the technology described herein.

FIG. 3 shows an embodiment of a graphics processor shader core execution unit (which may, e.g., function as the execution unit 32 of fragment shading stage 31 in the graphics processing pipeline shown in FIG. 2, but may also function as a compute shader core, or as any other form of shader core, as required) in more detail. (As will be appreciated by those skilled in the art, the shader core may include other elements, components, etc., not shown in FIG. 3. FIG. 3 simply illustrates the elements and components, etc., of the shader core that are relevant to the operation of the present embodiments.)

In particular, FIG. 3 shows the flow of a thread group inside the execution engine from thread group creation to retirement.

As shown in FIG. 3, when a thread group is spawned ('warp_create'), an initial program counter 34 (PC) is initialised to point to the beginning of a respective shader program. Any thread group state can be also be configured at this point.

The spawned thread group will then check if the PC 34 hits in the instruction cache 35 and gets back a link to the cache line and offset to the instruction. If it doesn't hit, it will wait until the instructions are loaded into the instruction cache 35.

When the instructions for the shader program that the thread group is spawned for are present in the instruction cache 34, the thread group can then be issued to a processing element 37 to execute the instructions in the shader program ('warp_issue').

When the processing element 37 receives a thread group, an instruction fetch circuit 38 will start requesting instructions from the instruction cache 35 ('Instr_request') using the link provided (and incrementing the offset for each fetched instruction). The fetched instruction data is then received back from the instruction cache 35 ('Instr_response') and placed into an instruction execution buffer 41.

The execution unit fetches instructions from the instruction execution buffer 41, and then processes the instructions appropriately, e.g. by fetching the relevant operands, performing any desired (arithmetic) operations, etc., and then writing back the result of the processing to its register file. The registers are kept in an operand buffer (not shown). When the thread group is evicted, its registers start to getting written back to the register file.

During the instruction fetch, a part of the fetched instruction ('Instr_response') is "poked" (Instr_'poke") to check whether the thread group (warp) may need to be evicted for the processing element. This could be because it is necessary to check if a dependency slot indicated by the instruction has been cleared before executing the next instruction. Or, this could be because of a case that would require a branch to a different place in the shader, killing, change of lane mask, and a few other reasons.

An eviction checking circuit (eviction circuit) 39 is thus able to determine from the instruction whether or not the thread group (warp) should be evicted.

When an eviction point is identified, the instruction is marked as the 'last' instruction in the instruction cache and the thread group (warp) slot is deallocated, so that another thread group takes its place on fetching instruction. The instructions of thread group (warp) will be processed from the instruction execution buffer 41 and once the 'last' instruction for the thread is processed, an eviction back to the scheduler 36 will take place.

In one approach, the instruction check circuit (eviction circuit) 39 could be arranged to evict the thread group (warp) whenever there is a dependency, e.g. without checking whether or not the dependency is met. However, this conservative eviction approach means that in some cases a thread group (warp) may be evicted, and re-scheduled, etc., unnecessarily.

Thus, in the present embodiment, rather than always evicting a thread group (warp) whenever there is a condition, e.g. dependency, that might need to be checked, the eviction check circuit (eviction circuit) 39 is further arranged to check during the instruction fetching whether or not the dependency is satisfied. As shown in FIG. 3, the instruction check circuit (eviction circuit) 39 is thus configured to send the thread group identifier (ID) for the thread group (warp) in question to an external dependency check unit 40 to check whether the dependency counter for that thread group, and thereby determine whether the dependency is already met, and can therefore be ignored.

Thus, in the present embodiment, when a thread group (warp) enters in a thread group (warp) slot in the instruction execution buffer 41 of the processing element 37, the eviction check circuit (eviction circuit) 39 in parallel performs a look-up for the dependency counters 40 for the instruction from the external thread group (warp) dependency control.

Thus, in the present embodiment, when it is determined that there is an outstanding dependency, the eviction check circuit (eviction circuit) 39 goes on to check at this point whether or not the dependency is satisfied. When it is determined that there are no outstanding dependency slots, it can be determined that it is safe to continue fetching without evicting the thread group (warp).

In this way, the present embodiment can avoid a thread group (warp) being conservatively evicted to the scheduler 36 when it does not need to be (since the dependency is already met and the instruction can be safely executed). It will be appreciated that such unnecessary thread group eviction may add latency and register file bandwidth overhead (since there would be an additional, unnecessary write back), and so the present embodiment can provide a more efficient shader performance.

Figure 4:
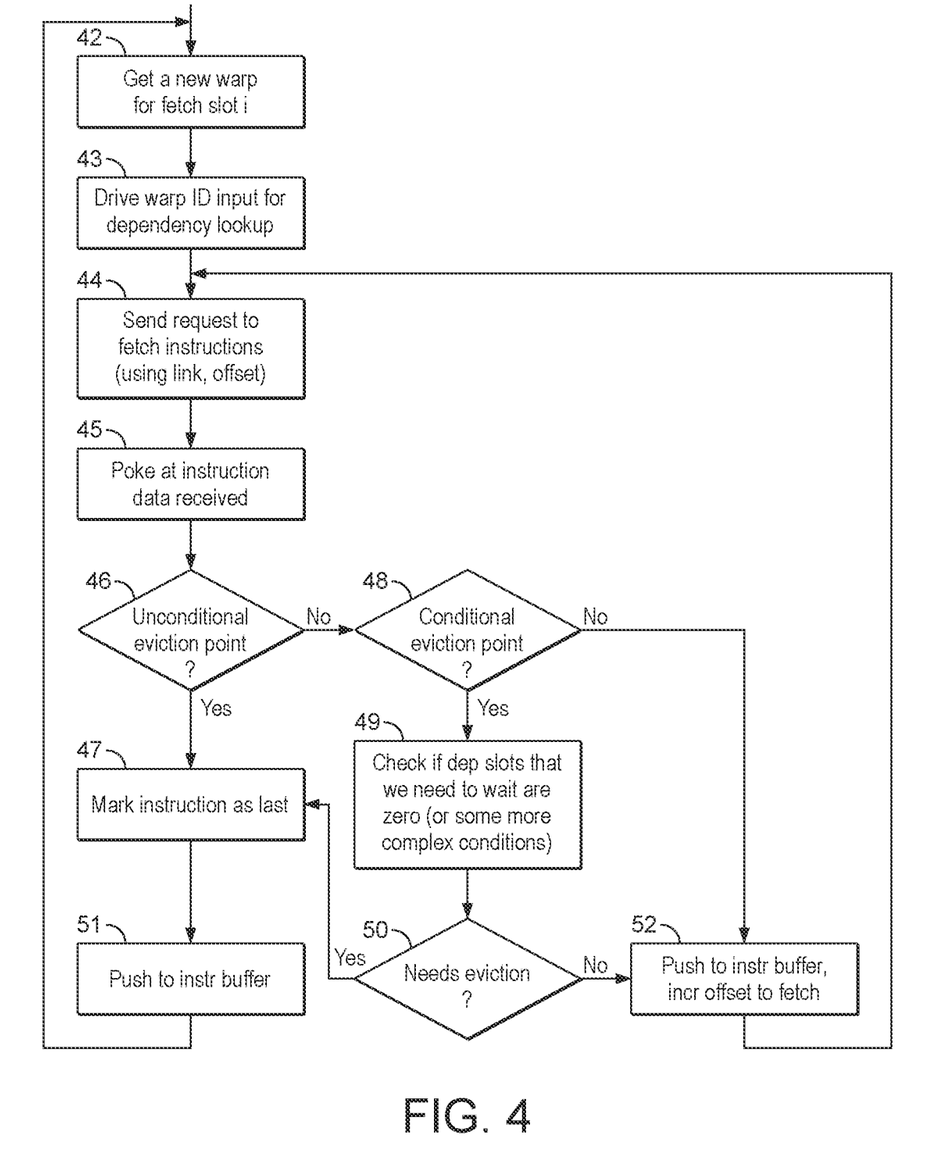
FIG. 4 is a flow chart illustrating an embodiment of the technology described herein.

FIG. 4 is a flow chart for fetching instructions and determining eviction points.

Firstly, a new thread group (warp) is obtained for the current fetch slot (step 42). The thread group (warp) identifier (ID) is then input, e.g. in order to allow dependency look-up, as will be explained later (step 43). A request is then sent to fetch the instructions for execution (using the link, offset, etc.) (step 44).

During this instruction fetch, a part of the instruction is checked ('poked') (step 45) to determine whether there is a need to unconditionally evict the thread group (step 46).

This may be, for example, because the current or next instruction is a messaging instruction or because the instruction is a branch instruction. Or, for example, if a thread group (warp) has diverged, it may be necessary to perform a branch re-convergence check (i.e. to examine the PC and call stack depths of all the threads in the thread group, and pick the ones with the highest priority).

Another example would be when a thread group (warp) has some fully discarded work items, in which case it may be desired to evict the thread group, e.g. so that 'early' dependency slots such as depth/colour dependency slots can be released faster.

When an unconditional eviction point is identified (step 46—yes) the instruction is then marked as 'last' (step 47) and the instruction is pushed to the instruction execution buffer (step 51). In that case, when the processing element reaches the instruction, because it is marked as 'last', this will cause the thread group (warp) to be evicted to the scheduler, and the thread group (warp) will be de-allocated on the next fetch (step 42).

If there are no unconditional eviction points (step 46—no), it is then checked whether the instruction is a conditional eviction point (step 48). For example, this may be because the instruction has a number of outstanding (unmet) dependencies that the execution needs to wait on.

If there are no conditional eviction points (step 48—no), e.g. since all of the dependencies are cleared (or because there are no dependencies), the instruction is pushed to the instruction execution buffer for execution (step 52), and the fetch offset is incremented to cause the next instruction to be fetched (step 44).

On the other hand, if there is (e.g.) an outstanding dependency (step 48—yes), it is then checked whether the corresponding dependency slot can be cleared (or any other suitable conditions that need to be checked) (step 49), to determine whether or not the thread group (warp) actually needs to be evicted (step 50). If it is determined that the thread group (warp) does not in fact need to be evicted (step 50—no) the instruction is pushed to the instruction buffer for execution (step 52), and the fetch offset is incremented to cause the next instruction to be fetched (step 44).

Otherwise, if it is determined that the thread group (warp) does need to be evicted (step 50—yes), the instruction is marked as the 'last' instruction (step 47) and the instruction is then pushed to the instruction buffer (step 51) without incrementing the fetch offset, such that the thread group to be evicted to the scheduler, and the thread group (warp) will be de-allocated on the next fetch (step 42).

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A graphics processor comprising:
a programmable execution unit operable to execute programs to perform processing operations, and in which when executing a program, the execution unit executes the program for respective groups of one or more execution threads;
an instruction cache that stores instructions for programs to be executed by the execution unit, wherein when executing a program for a respective group of one or more execution threads, the execution unit is arranged to fetch the instructions in the program from the instruction cache for execution; and
an eviction checking circuit that is configured to, for an instruction being fetched for a respective group of execution threads from the instruction cache, before the instruction is executed:
determine whether the instruction includes one or more conditional eviction conditions that if not met indicate that the program to which the instruction relates should not continue to be executed for the group of execution threads; and
when it is determined that the instruction includes one or more conditional eviction conditions that if not met indicate that the program to which the instruction relates should not continue to be executed for the group of execution threads, determine whether or not the conditional eviction conditions are met;
wherein, in response to the determination whether or not the conditional eviction conditions are met:
when it is determined that the conditional eviction conditions are met, the eviction checking circuit allows the execution unit to continue execution of the program for the group of execution threads;
whereas when it is determined that the conditional eviction conditions are not met, the eviction checking circuit causes the execution unit to evict the group of execution threads to which the instruction relates.

2. The graphics processor of claim 1, wherein:
the one or more conditional eviction conditions include one or more dependency conditions, wherein if the dependency condition is not met, the next instruction in the program should not be executed for the group of execution threads.

3. The graphics processor of claim 2, wherein:
the one or more dependency conditions include a wait modifier indicating one or more data dependencies on which the execution of the program should wait, and wherein the determining whether or not the dependency conditions are met comprises checking a corresponding one or more dependency counters tracking the dependency conditions.

4. The graphics processor of claim 3, wherein:
when it is determined that the instruction includes one or more dependency conditions that need to be checked before the next instruction in the program can be executed the eviction checking circuit is configured to check the dependency counters for all of the dependency conditions that are being tracked without checking if the respective dependency conditions apply to the instruction in question and to evict the group of execution threads executing the program to which the instruction relates when it is determined that any of the dependency conditions that are being tracked by the dependency counters are not met.

5. The graphics processor of claim 1, wherein:
the eviction checking circuit is further configured to determine whether the instruction is associated with any unconditional eviction conditions that if present indicate the group of execution threads to which the instruction relates should always be evicted.

6. The graphics processor of claim 5, wherein:
the eviction checking circuit is configured to determine whether the instruction includes any unconditional eviction conditions prior to determining whether the instruction includes one or more conditional eviction conditions, and wherein when it is determined that the instruction includes any unconditional eviction conditions, the eviction checking circuit causes the execution unit to evict the group of execution threads without checking whether the instruction includes one or more conditional eviction conditions or whether any condition eviction conditions are met.

7. The graphics processor of claim 5, wherein:
the unconditional eviction conditions include one or more of: (i) that the instruction comprises a messaging instruction; (ii) that the next instruction in the program comprises a messaging instruction; and (iii) that the instruction comprises a branch instruction.

8. The graphics processor of claim 1, wherein:
when it is determined based on the determination of whether the one or more dependency conditions associated with the instruction are satisfied that the execution thread group should be evicted due to one or more unmet conditional eviction conditions, the evicted execution thread group is passed to a thread group execution controller circuit for subsequent re-scheduling.

9. The graphics processor of claim 1, wherein:
when it is determined that an execution thread group should be evicted, the instruction is marked as the last instruction in the program to trigger an eviction of the group of execution threads executing the program to which the instruction relates when the execution unit executes the instruction.

10. The graphics processor of claim 1, wherein:
when it is determined that an execution thread group should be evicted, the group of execution threads executing the program to which the instruction relates is immediately evicted.

11. A method of operating a graphics processor, the graphics processor comprising:
a programmable execution unit operable to execute programs to perform processing operations, and in which when executing a program, the execution unit executes the program for respective groups of one or more execution threads; and
an instruction cache that stores instructions for programs to be executed by the execution unit, wherein when executing a program for a respective group of one or more execution threads, the execution unit is arranged to fetch the instructions in the program from the instruction cache for execution;
the method comprising:
when an instruction is fetched for a respective group of execution threads from the instruction cache, before the instruction is executed:
determining whether the instruction includes one or more conditional eviction conditions that if not met indicate that the program to which the instruction relates should not continue to be executed for the group of execution threads;

when it is determined that the instruction includes one or more conditional eviction conditions that if not met indicate that the program to which the instruction relates should not continue to be executed for the group of execution threads, determine whether or not the conditional eviction conditions are met; and in response to the determination whether or not the conditional eviction conditions are met, either:

continuing execution of the program for the group of execution threads when it is determined that the conditional eviction conditions are met; or evicting the group of execution threads to which the instruction relates when it is determined that the conditional eviction conditions are not met.

12. The method of claim 11, wherein:

the one or more conditional eviction conditions include one or more dependency conditions, wherein if the dependency condition is not met, the next instruction in the program should not be executed for the group of execution threads.

13. The method of claim 11, wherein:

the one or more dependency conditions include a wait modifier indicating one or more data dependencies on which the execution of the program should wait, and wherein the determining whether or not the dependency conditions are met comprises checking a corresponding one or more dependency counters tracking the dependency conditions.

14. The method of claim 13, wherein:

when it is determined that the instruction includes one or more dependency conditions that need to be checked before the next instruction in the program can be executed, the method comprises checking the dependency counters for all of the dependency conditions that are being tracked without checking if the respective dependency conditions apply to the instruction in question and evicting the group of execution threads executing the program to which the instruction relates when it is determined that any of the dependency conditions that are being tracked by the dependency counters are not met.

15. The method of claim 11, further comprising:

determining whether the instruction is associated with any unconditional eviction conditions that if present indicate the group of execution threads to which the instruction relates should always be evicted.

16. The method of claim 15, further comprising:

determining whether the instruction includes any unconditional eviction conditions prior to determining whether the instruction includes one or more conditional eviction conditions, and wherein when it is determined that the instruction includes any unconditional eviction conditions, the method further comprises evicting the group of execution threads without checking whether the instruction includes one or more conditional eviction conditions or whether any condition eviction conditions are met.

17. The method of claim 15, wherein:

the unconditional eviction conditions include one or more of: (i) that the instruction comprises a messaging instruction; (ii) that the next instruction in the program comprises a messaging instruction; and (iii) that the instruction comprises a branch instruction.

18. The method of claim 11, wherein:

when it is determined based on the determination of whether the one or more dependency conditions associated with the instruction are satisfied that the execution thread group should be evicted due to one or more unmet conditional eviction conditions, the method comprises passing the evicted execution thread group to a thread group execution controller circuit for subsequent re-scheduling.

19. The method of claim 11, wherein:

when it is determined that an execution thread group should be evicted, the method comprises marking the instruction as the last instruction in the program to thereby trigger an eviction of the group of execution threads executing the program to which the instruction relates when the execution unit executes the instruction.

20. The method of claim 11, wherein:

when it is determined that an execution thread group should be evicted, the method comprises immediately evicting the group of execution threads executing the program to which the instruction relates.

* * * * *